United States Patent [19]

Swinderman

[11] Patent Number: 4,598,823
[45] Date of Patent: Jul. 8, 1986

[54] CONVEYOR BELT CLEANER
[75] Inventor: Robert T. Swinderman, Kewanee, Ill.
[73] Assignee: Martin Engineering Company, Neponsit, Ill.
[21] Appl. No.: 579,707
[22] Filed: Feb. 13, 1984
[51] Int. Cl.⁴ .............................................. B65G 45/00
[52] U.S. Cl. ..................................... 198/497; 198/499
[58] Field of Search ............... 198/497, 499; 403/381, 403/331; 15/256.5 R, 245

[56] References Cited

U.S. PATENT DOCUMENTS

| | | | |
|---|---|---|---|
| 1,975,591 | 11/1932 | Sinden | 198/499 |
| 3,342,312 | 9/1967 | Reiter | 198/499 |
| 4,098,394 | 7/1978 | Stahura | 198/499 |
| 4,131,194 | 12/1978 | Andersson | 198/499 X |
| 4,202,437 | 5/1980 | Gordon | 198/497 |
| 4,269,301 | 5/1981 | Gibbs | 198/499 |
| 4,359,150 | 11/1982 | Bowman et al. | 198/499 |
| 4,389,936 | 6/1983 | Jaffa et al. | 15/256.5 X |

Primary Examiner—Joseph E. Valenza
Assistant Examiner—Michael Stone
Attorney, Agent, or Firm—McWilliams, Mann, Zummer and Sweeney

[57] ABSTRACT

A conveyor belt cleaning arrangement consisting of a transversely disposed support which includes a plurality of connector slots. One or more elastomeric cleaner blades, either of the doctor blade type or the arm and blade type, include a locking device to releasably connect the blade to the support without the use of fasteners and secure the blade against lateral motion and hold the blade in position for cleaning the belt.

1 Claim, 8 Drawing Figures

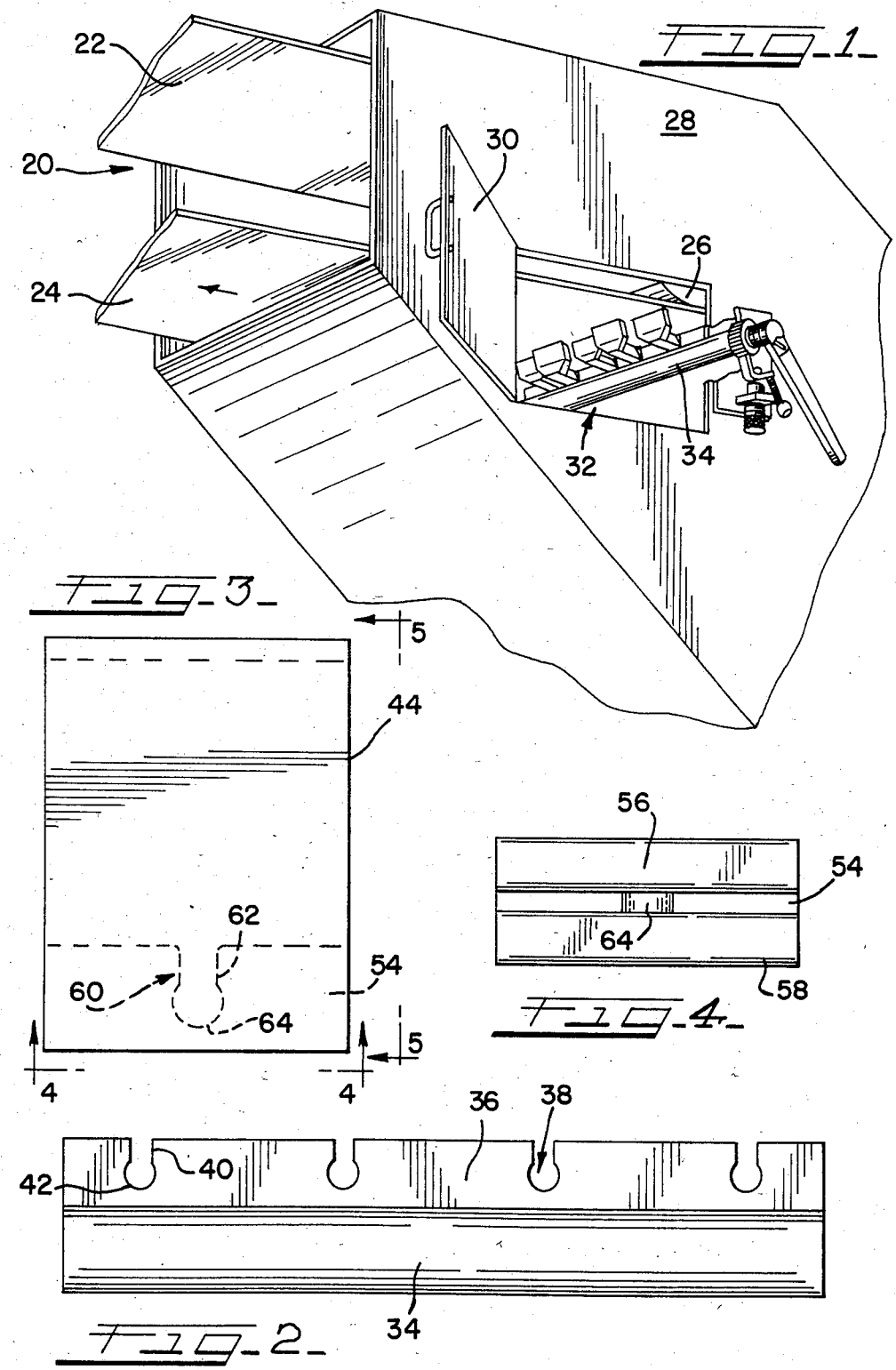

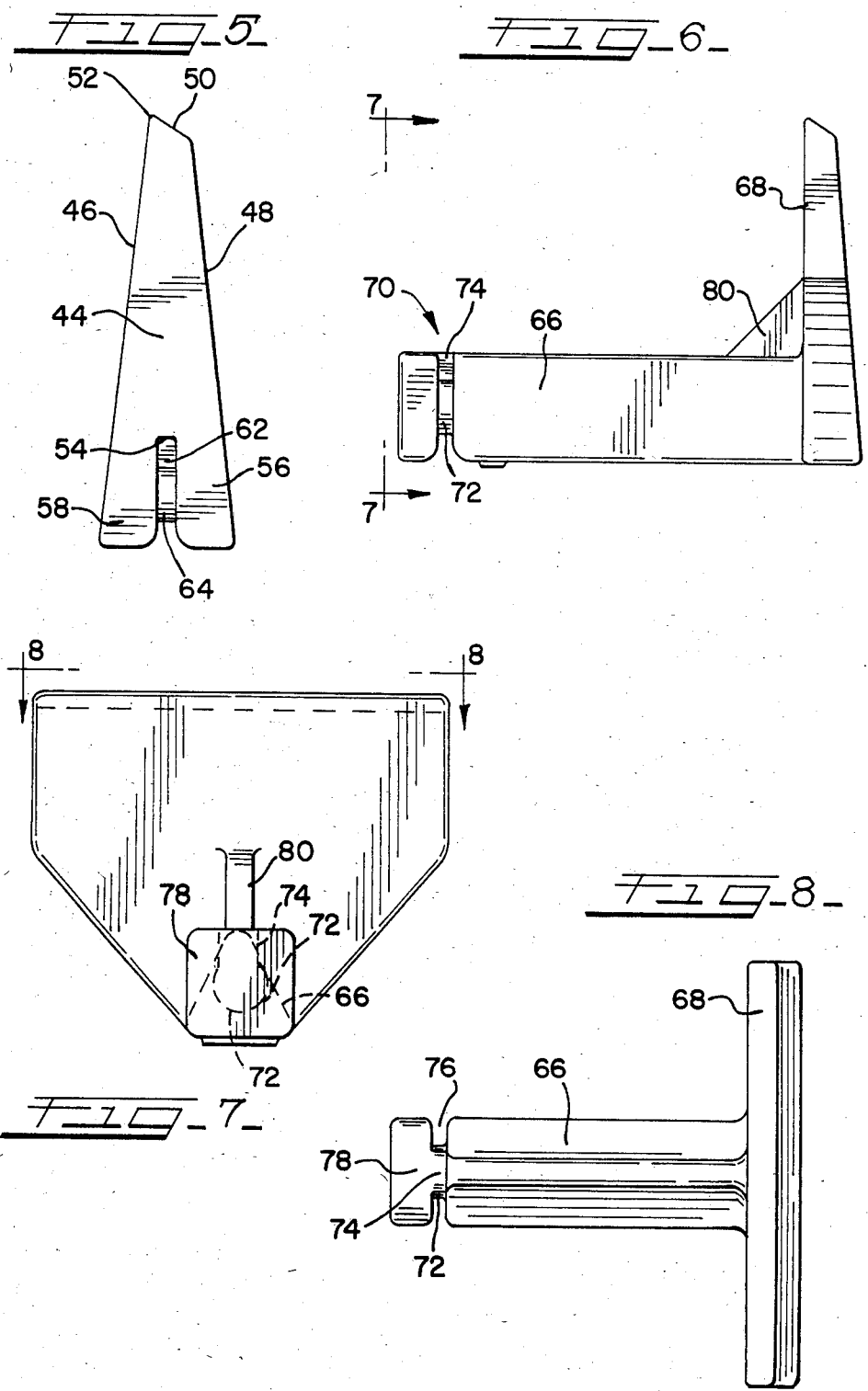

CONVEYOR BELT CLEANER

BACKGROUND OF THE INVENTION

It has been known in the art to provide conveyor belt cleaners in which a transversely disposed cross-shaft provides a support for individually mounted belt cleaner blades of either the doctor blade or arm and blade type. Generally the blades are mounted by means of fasteners to mounting members disposed on the cross-shafts. When the blades wear beyond certain limits, the fasteners are removed and the blades are replaced. This type arrangement is shown in U.S. Pat. Nos. 4,098,394, 3,598,231, 2,794,540, 1,975,591, 3,504,780, and 3,342,312.

Other arrangements have attempted to provide for removal and replacement of cleaner blades without the use of fasteners. Some examples are shown in U.S. Pat. Nos. 3,999,649, 4,131,194, 4,202,437, and 4,265,358.

Still others have recognized the advantages of a belt cleaner arrangement in which the arm and blade are formed as an integral unit, as shown in U.S. Pat. Nos. 897,955 and 2,227,776.

Other arrangements of interest are shown in U.S. Pat. Nos. 4,328,888, 3,913,728, and 3,952,863.

None of the prior art, however, discloses a belt cleaner arrangement which provides the advantages of the present device.

SUMMARY OF THE INVENTION

The present inVention provides, in one embodiment, a conveyor belt cleaner in which a doctor blade formed of a resilient, elastomeric material can be snap fit into locking association with the transverse support without the need for fasteners which are time consuming and can become lost. In the arm and blade embodiment of the present invention, the arm and the blade are integrally formed as a single unit of a resilient, elastomeric material. A snap fit connector is provided at the end of the arm opposite the blade to secure the unit to the support. Such an arrangement allows the blade to rotate about the central axis of the arm to give better alignment with the belt. Due to the resilience of the arm and blade, the pressure applied by rotation of the transverse support can cause the angle of the blade with respect to the belt to be incrementally adjusted with the ability to go from a negative angle to a positive angle depending upon the particular circumstances of the environmental conditions.

DESCRIPTION OF THE DRAWINGS

FIG. 1 is a perspective view showing the belt cleaning arrangement in operation.

FIG. 2 is a front view of the transverse support member with the cleaner blades removed.

FIG. 3 is a front view of a doctor blade removed from the transverse support member incorporating the features of the present invention.

FIG. 4 is a bottom view of the doctor blade taken along the lines 4—4 of FIG. 3.

FIG. 5 is a side view of the doctor blade taken along the lines 5—5 of FIG. 3.

FIG. 6 is a side view of the arm and blade embodiment of the present invention removed from the transverse support member.

FIG. 7 is a rear view of the arm and blade taken along the lines 7—7 of FIG. 6.

FIG. 8 is a top view of the arm and blade member taken along the lines 8—8 of FIG. 7.

DESCRIPTION OF THE PREFERRED EMBODIMENT

FIG. 1 shows, in perspective, the discharge end portion of a typical conveyor belt 20 having an upper or delivery run 22 and a lower or return run 24, the belt being trained about a drum or roller 26 conventionally carried in a frame (not shown) within a housing 28. The housing is provided with an access door 30 which allows the operator to inspect the belt cleaning operation.

A belt cleaner assembly 32 is provided consisting of a support 34 which is disposed below and substantially transverse to the direction of travel of the return run 24, as indicated by the arrow. Although FIGS. 1 and 2 illustrate the support 34 as being a circular shaft, any of a number of commonly used support members could be substituted for the circular shaft and operate within the scope of the present invention. Carried on the shaft 34 is a radially upstanding flange 36 which defines a plurality of connector apertures 38, the purpose for which will become apparent. If a flat bar or plate were used as a support member, no flange would be necessary. The apertures 38 would be formed directly into the bar. The apertures 38 include a slot section 40 and at the lower end a generally circular section 42. The arrangement of the cross-shaft 34, flange 36, and connectors 38 are best shown in FIG. 2. Although the aperture 38 is illustrated generally in the form of a keyhole, any of a number of connector apertures of different shape could be substituted to achieve the same result.

Two different embodiments of the present invention are disclosed herein. One embodiment will be referred to as the "doctor blade" arrangement, and is shown in FIGS. 3, 4, and 5. The other embodiment is referred to as the "arm and blade" arrangement and is best shown in FIGS. 6, 7, and 8. Either or both of these embodiments can be interchangeably used in a single belt cleaning arrangement.

FIG. 3 illustrates and describes a doctor blade 44 incorporating the features of the present invention. The doctor blade 44, as shown in FIGS. 3 through 6, has a triangularly shaped cross-section and is formed of an elastomeric material. Satisfactory results have been achieved by molding the doctor blade of 90 durometer urethane which exhibits low "compression set" qualities. The doctor blade 44 includes opposed faces 46 and 48 which are connected at the upper end by an inclined section 50 terminating in a point or edge 52. The edge 52 contacts the lower run 24 of the conveyor belt and effects the cleaning operation. Metallic or non-metallic elements (not shown) can be embedded into the cleaning portion of the blade, as well as to the face, in either the doctor blade or the arm and blade embodiment. One example would be ceramic beads embedded into the edge 52 or tungsten carbide sheets affixed against the face 46.

At the lower end of the doctor blade 44 a groove 54 is formed which extends laterally through the lower end of the blade such that a pair of legs 56, 58 are defined, one disposed on each side of the slot 54. Locking means are provided consisting of a downwardly extending lug 60 which is formed to include a neck section 62 and a generally circular bulb section 64.

It will be seen that the lug 60 is adapted to matingly engage the connector 38 so that the bulb 64 is disposed within the circular section 42 and the neck section 62 lies within the slot section 40. Such a connecting arrangement of locking means and connector releasably locks the doctor blade 44 to the support member 34 so as to prevent linear movement of the blade 44 along the support member 34 and holds the blade in position for cleaning the conveyor belt. Obviously, if the aperture 38 is formed of a different shape than illustrated in FIG. 2, then the lug 60 must be shaped so as to matingly engage the aperture. It should also be apparent that a mirror image reversal of elements such that the aperture 38 is formed in the cleaner blade and the lug 60 is formed on the support member would also be operative and such an arrangement is considered to be within the scope of the present arrangement.

The arm and blade embodiment of the present invention is disclosed in FIGS. 6 through 8. This embodiment includes an arm 66, shown as triangular in cross-section, integrally formed with a blade 68, both the arm and the blade being formed of elastomeric materials. Acceptable results have been achieved when both the arm and blade are molded of the same 90 durometer urethane, but it is also within the scope of the present invention to mold the unit as an integral part in which the arm 66 consists of 60 durometer urethane, the blade 68 of 90 durometer urethane, and the fastening area between the arm and blade of 80 durometer urethane. Conceivably the parts could also be made of dissimilar materials, for example, rubber, nylon, and urethane, and bonded together as an integral unit. Any of a number of plastics or rubbers, which exhibit the appropriate resilient tendencies, could be utilized to form the integral arm and blade element.

Locking means 70 are formed on the arm 66 toward the end opposite the blade 68. The locking means 70 consist of a generally circular section 72 and a narrower neck section 74 disposed within an opening 76 formed between the arm 66 and a head section 78. The head 78 is generally of rectangular configuration. A web 80 is shown connecting the blade 68 to the arm 66 and provides additional support against undue flexing of the arm with respect to the blade.

It is also contemplated that an arm could be formed having a hollow internal chamber capable of being fitted with different inserts to change the spring rate or flexibility of the arm. The insert (not shown) could be either metallic or non-metallic.

As can readily be seen, the locking means 70 is arranged to be connected to the connectors 38 of the support shaft 34 so that the circular section 72 lies within the circular section 42 and the neck section 74 lies within the glove section 40. Such an arrangement releasably locks the arm and blade to the shaft 34 and prevents linear movement of the arm and blade along the support member and holds the blade in position for cleaning the conveyor belt. As previously discussed, with respect to the doctor blade embodiment, a reversal of elements so as to make the male connector formed on the support and the female locking means formed on the arm is also considered within the scope of the present invention.

Since the arm and blade unit is flexible, it is able to absorb shock due to impact throughout the unit rather than at specific flexible connections, as, for example, the spring arrangement in prior art torsion arm cleaners. This advantage allows the construction of a support frame of lighter, non-metallic materials, such as fiberglass. This, in turn, results in a totally corrosion resistant belt cleaner with no corrosion-prone sub-parts such as fasteners. The constant flexing also helps prevent buildup on the arms and blades.

In the operation of the doctor blade arrangement, a plurality of doctor blades 44 are snap fit through the connections previously described into the flange 36 on shaft 34. The shaft is then raised by an adjustment mechanism (not shown) so that the doctor blades 44 and particularly the edge 52 engage the lower run 24 of the conveyor belt for cleaning. As the edge 52 wears, the shaft can be adjusted upwardly. When replacement of the blades 44 is desired, the shaft is lowered and slid linearly out of the housing 28 providing access of the operator to the cleaner blades. The old blades 44 can be pried from the flange 36 and new blades snap fit into the flange with the tap of a hammer. Thus, replacement is accomplished without the use of any fasteners or special tools. It is common experience in the maintenance of the belt cleaning arrangements that where fasteners are used, they can easily become lost during the replacement operation. The present invention eliminates this possibility and provides for easy replacement of the belt cleaner blades. The worn blade can be reconstructed by remolding the worn portion of the blade back onto the original remaining part.

The operation of the arm and blade cleaner is similar to that described for the doctor blade arrangement, but additional advantages of this embodiment exist. Since the arm 66 and the blade 68 are both formed of a resilient, elastomeric material, such a construction allows the blade to rotate about the central axis of the arm in a limited fashion so as to insure proper alignment between the blade and the belt being cleaned. If, for any reason, there is some initial misalignment between belt and blade when the shaft is rotated to exert force, the blade will inherently align itself with the belt due to the resilient nature of both the arm and the blade and their connection with each other.

An additional advantage is found in the arm and blade embodiment. When the arms 66 are connected to the flange 36, the shaft 34 is then rotated by the handle, as shown in FIG. 1, to secure contact between the blade and the return run 24. As shown in FIG. 6, the blade 68 is disposed generally perpendicular to the central axis of the belt 24. Depending upon the particular environment in which the belt cleaner is designed to operate, this arrangement may be varied so that the blade 68 can assume a 90° angle with respect to the belt, as shown in FIG. 6, or an acute angle or an obtuse angle depending upon the desired arrangement. The shaft can, however, be incrementally adjusted to vary the angle with increasing rotation resulting in a general increase in the angle between the blade and the belt. If, for example, the initial angle between blade and belt is an acute angle, additional rotation of the shaft can change the angle from acute to perpendicular, with further rotation resulting in a change in the angle from perpendicular to obtuse. The same result would follow if the support were arranged for vertical adjustment. The ability to effect such incremental adjustment of the angle between the blade and the arm is of great advantage.

The present arrangement, in either embodiment, provides a conveyor belt cleaner with sufficient flexibility so as to prevent damage to the belt from the cleaner blade due to reversing belt operation, over-wear, over-adjustment, or sparking. It also provides an arrangement which utilizes non-metallic cleaner blades which offer greater safety if, for some reason, the blade fails or becomes disconnected and falls into the product stream.

Various features of the invention have been particularly shown and described in connection with the illustrated embodiments of the invention, however, it must be understood that these particular arrangements merely illustrate and that the invention is to be given its fullest interpretation within the terms of the appended claims.

What is claimed is:

1. A conveyor belt cleaning arrangement consisting of a linear support member disposed transverse to the direction of conveyor belt travel, a flange extending radially outwardly from said support member, connnector means consisting of slots formed in said flange adapted to locate and position individual belt cleaner blades, and one or more belt cleaner blades formed of an elastomeric material, each of said blades including locking means consisting of a groove disposed laterally through its lower end such that a pair of legs are defined, one disposed on each side of said groove, and a lug disposed in said groove between said legs, said lug adapted to matingly engage said slot in said flange to releasably lock said blade to said support member so as to prevent linear movement of said blade along said support member and to hold said blade in position for cleaning said conveyor belt.

* * * * *